April 18, 1939.  E. T. DAVIS  2,155,346

ELECTRICAL MEASURING SYSTEM

Filed May 8, 1936   3 Sheets-Sheet 1

Inventor
Elwood T. Davis
By Cornelius D. Ehret
Attorney

April 18, 1939. E. T. DAVIS 2,155,346
ELECTRICAL MEASURING SYSTEM
Filed May 8, 1936 3 Sheets-Sheet 2
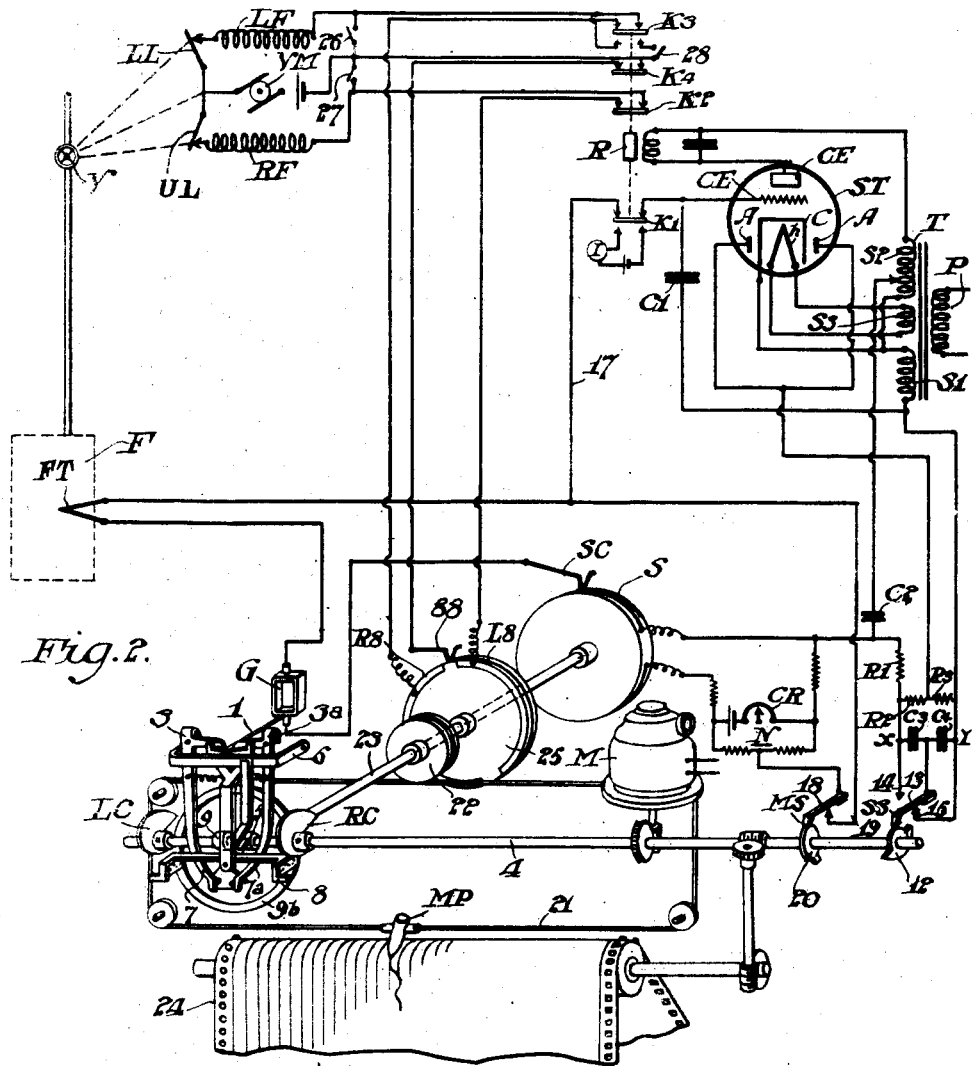
Fig. 2.
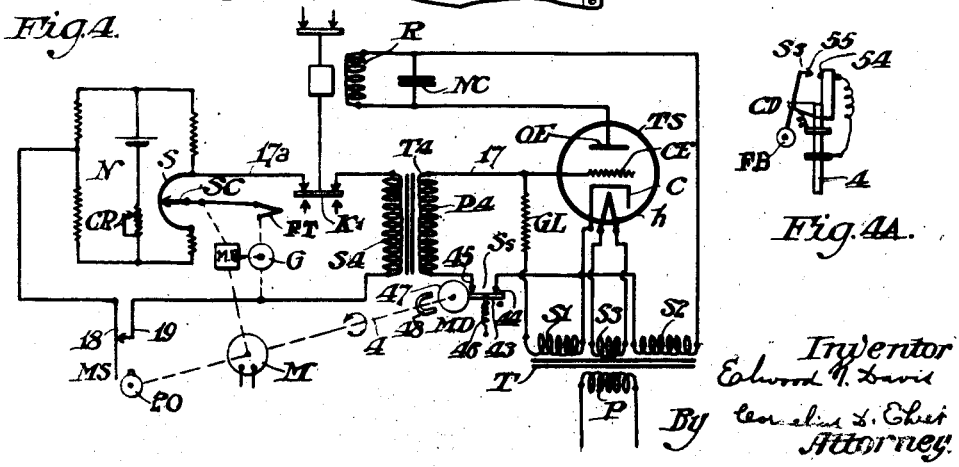
Fig. 4.
Fig. 4A.
Inventor
Elwood T. Davis
By his Attorney

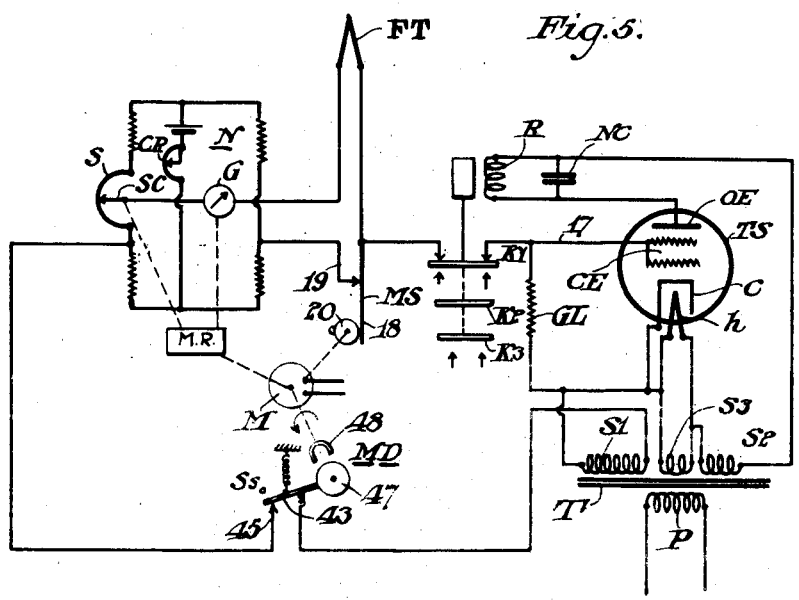

Patented Apr. 18, 1939

2,155,346

UNITED STATES PATENT OFFICE 2,155,346

ELECTRICAL MEASURING SYSTEM

Elwood T. Davis, Brookline, Pa., assignor to Leeds & Northrup Company, Philadelphia, Pa., a corporation of Pennsylvania Application May 8, 1936, Serial No. 78,611

25 Claims. (Cl. 172—239)

My invention relates to systems for controlling, recording, or controlling and recording, the magnitude or changes in magnitude of a condition, as temperature, pressure, or any other physical, electrical, or chemical condition.

In accordance with one aspect of my invention, an electro-mechanical control system, comprising means responsive to the changes in magnitude of a condition, adjustable means, and a mechanical relay interposed between the responsive means and the adjustable means, is provided with a supervisory system which detects derangement of the mechanical relay or the condition-responsive means either to provide an indication or to assume control of the regulating means normally subject to the control system, or to provide both a warning and an emergency control.

More specifically, the supervisory system includes an electronic tube, the potential of whose control electrode is maintained, so long as the mechanical relay is operative, at such magnitude as to preclude operation of supervisory means in the output system of the tube; further, in some forms of the invention, the input system of the tube also includes a balanceable measuring network whose non-derangement or continuity of operativeness is essential to maintenance of the aforesaid control electrode potential.

My invention further resides in the features of combination and arrangement hereinafter described and claimed.

For an understanding of my invention and for an illustration of some of the various forms it may take, reference is to be had to the accompanying drawings, in which:

Fig. 2 illustrates diagrammatically a system for recording and controlling temperature provided with a supervisory system for detecting mechanical or electrical failures of the control system;

Fig. 4 is another modified form of supervised control system;

Fig. 4A is a modification of one of the control switches of Fig. 4;

Figs. 5 and 6 diagrammatically illustrate further modifications.

Figure 1:
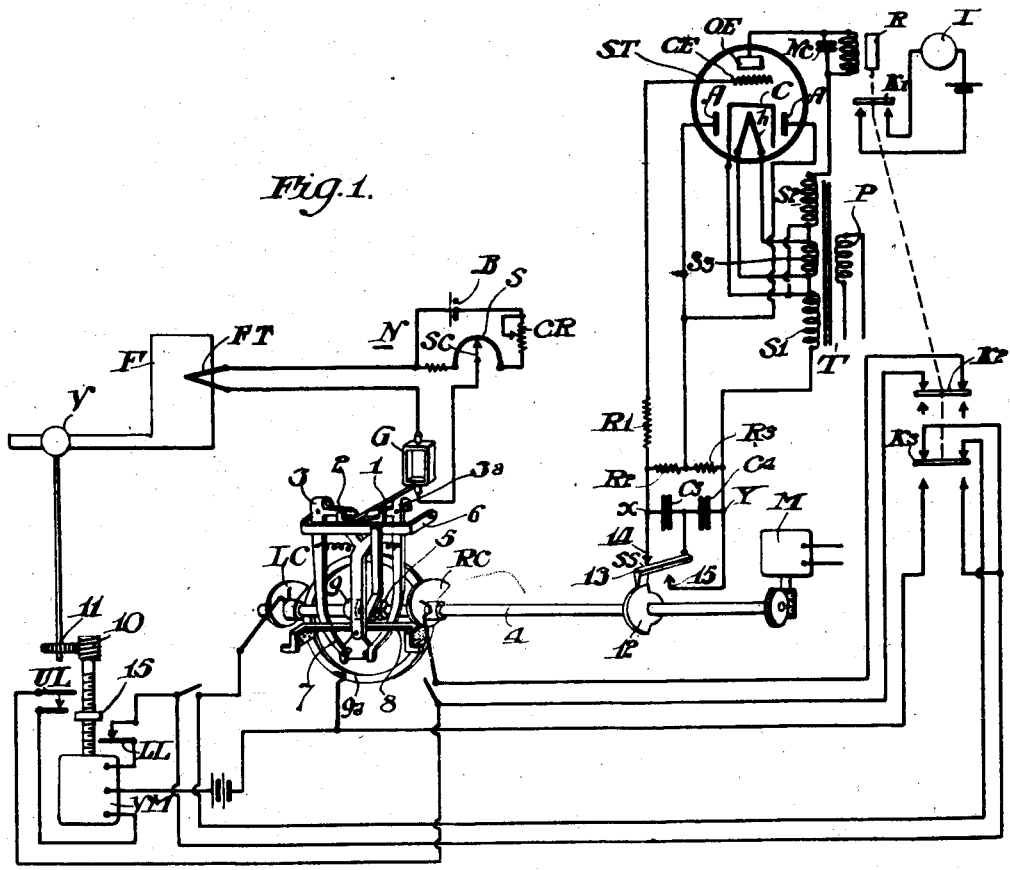
Fig. 1 illustrates diagrammatically an automatic temperature control system provided with a supervisory system.

In the system of Fig. 1 there is illustrated, as exemplary of a control system to which the invention may be applied, an arrangement for controlling the temperature of a furnace F. When the temperature is at the desired magnitude, the voltage developed by the thermocouple FT is balanced by the effective voltage of the potentiometer network N, as determined by the setting of contact SC with respect to the slidewire resistance S. Under this circumstance no current flows through the galvanometer coil G; when, however, the temperature is higher or lower than the desired magnitude, the voltages are unbalanced and coil G deflects in one direction or the other depending upon the sense of the departure of the temperature from the normal or desired magnitude.

Assuming a fall in temperature, the pointer 1 of the galvanometer moves to the left beneath the arm 2 of the bell-crank lever 3 of a mechanical relay mechanism similar to that disclosed in Leeds Patent No. 1,125,699 and Squibb Patent No. 1,935,732. During a revolution of the shaft 4, which is driven at constant speed by any suitable motor M, such as a clockwork motor or an electric motor M of suitable type, the cam 5 rocks the bail member 6. With the pointer 1 deflected from its neutral position, the upward movement of the member 6, through the pointer, effects angular displacement of the bell-crank 3 in counterclockwise direction. The arm 7 of the lever is therefore effective to swing the contact member 8 in a counterclockwise direction and to an extent varying in accordance with the extent of deflection of the pointer 1 from its neutral position.

Subsequently, in the cycle of operation, the cam 9 on shaft 4 permits the member 8 in its displaced position to engage the stationary friction-disk 9a.

During continued rotation of the shaft the cam RC engages the member 8 and returns it to its neutral position shown in Fig. 1, the period of engagement between cam RC and member 8 depending upon the extent to which it had been displaced in response to deflection of the pointer.

The friction between shoes carried by member 8 and the stationary disk 9a ensures adequate contact pressure between member 8 and cam RC during the return of member 8 to its neutral position.

Conversely, when the temperature is higher than normal, the pointer 1 deflects to the right and thus causes, during the cycle of operation, movement of the bell-crank lever 3a to effect clockwise adjustment of the contact member 8. Subsequently, in the cycle of operation, the contact member 8 is returned to its neutral position by cam LC, the period of engagement depending upon the extent of deflection of pointer 1.

The cams LC, RC, and the contact member 8 are utilized as a reversing switch for the motor VM suitably connected, as by gearing 10, 11 to the valve V, or other control member, whose setting determines the rate of application of an agent, as fuel, or electric current, controlling the magnitude of the temperature within the furnace F. Accordingly, when the temperature falls or rises from the desired magnitude the response of the pointer 1, through the mechanical relay mechanism, effects actuation of a control device in proper sense to return the temperature, or other controlled condition, to normal.

In the system as thus far described, the automatic control operation depends upon continuous rotation of shaft 4; if, for any reason, this shaft should stop, for example, because of electrical or mechanical failure of the rotor M, an unsafe condition may result. For example, the mechanism might stop with cam RC in engagement with contact 8 to effect operation of the motor VM. Since the apparatus is not in condition to perceive when the temperature has been raised to normal, the operation of the motor VM is neither discontinued when the temperature has been restored to normal nor reversed when the temperature exceeds normal, hence the temperature of the furnace may become dangerously high with consequent damage to work in the furnace, or to the furnace. In fact, regardless of the position of the elements of the mechanical relay existing when rotation of shaft 4 is interrupted, an inherently unsafe condition results.

The supervisory system for indicating when the mechanical relay mechanism becomes inoperative, or for itself effecting a predetermined and safe control action, comprises in the particular system illustrated in Fig. 1, a cam 12 which rotates, so long as shaft 4 is rotating, to effect engagement of the contact 13 alternately with contacts 14 and 15 of switch SS. As will hereinafter appear, so long as the switch SS is thus periodically operated, the potential applied to the control electrode CE of the tube ST is maintained at a predetermined value for which the anode current of the tube ST, flowing through the coil of relay R, is sufficient to hold the contacts K1, K2 and K3 in their "up" position. When, however, the rotation of shaft 4 stops, the potential applied to the grid of the tube, as hereinafter explained, is changed, with the result the contacts of relay R fall to their "down" position.

Contact K1 may be used, for example, to control the circuit of a suitable alarm or indicator I to give warning to an operator that the automatic control system has become inoperative, whereupon the operator may effect desired adjustments of valve V until the fault in the automatic control apparatus is located and remedied. The warning may be "positive", for example, the indicator I may be an electric bulb energized when relay R is deenergized, or it may be "negative", for example, it may be an electric bulb deenergized when relay R is deenergized.

The supervisory system may include, as shown, provision for automatically effecting, when the mechanical relay fails, operation of the valve motor VM, or equivalent, in such sense as to render the system safe. Specifically, upon deenergization of the relay R, the circuit-opening movement of contact K2 may be utilized to interrupt the circuit to the motor VM through cam RC; therefore, in event the shaft 4 stops when cam RC is in position to effect valve-opening, or temperature-raising operation of motor VM, the supervisory system by the aforesaid opening movement of contact K2 prevents the temperature-raising adjustment of valve V. Preferably the relay R also includes the contacts K3 which, when the relay is deenergized, maintains that circuit to the motor VM which includes the cam LC. In the event the mechanical relay mechanism fails with cam LC in engagement with the contact member 8, the motor VM operates to effect a temperature lowering adjustment of valve V; the motor VM continues its operation until the traveling cam 15 opens the lower limit switch LL.

The lower limit switch LL and the upper limit switch UL also perform their usual service which is to suspend the automatic control action when the valve reaches its minimum or maximum setting, until the temperature change reverses.

The manner in which the intermittent operation of contact 13 or switch SS maintains a predetermined potential of the grid tube ST and in which the grid potential is changed upon interruption of the periodic operation of the switch is now explained.

The primary P of transformer T is connected to a suitable source of alternating current, for example, to the same source of current which supplies motor M when of the electric type. One terminal of the secondary S1 of transformer T is connected to the cathode C of tube ST and the other terminal of the secondary is connected to the contact 15 of switch SS. The control electrode or grid CE of tube ST is connected through resistance R1 of suitably high magnitude, for example, about 10 megohms, to the contact 14 of the switch SS.

Across the contacts 14, 15 of switch SS are connected in series the two condensers C3, C4 of suitable magnitude, for example, one microfarad, and the common terminal of the condensers is connected to the movable contact 13 of switch SS.

Across the contacts 14, 15 are connected in series the resistances R2, R3 having, for example, resistances of the order of 10 megohms and .5 megohm, respectively. The common terminal of these resistances is connected to the anodes A, A of tube ST. One terminal of the secondary S2 of transformer T is connected to the cathode C of tube ST and its other terminal is connected to the anode or output electrode OE of tube ST through the winding of relay R.

The rectified current passed by anodes A, A continuously tends to build up a potential across condensers C3 and C4. However, so long as switch SS is operated, condensers C3 and C4 are alternately discharged. If cam 12 ceases to rotate and therefore fails to operate switch SS, a charge builds up in one or the other or both of condensers C3 and C4 and so raises the potential of the control electrodes CE of tube ST to a sufficiently high negative value to reduce the output current of the tube through relay R to such value that the relay contact structure falls or moves to its other position, whereupon, as previously described, the relay contacts may effect one or more supervisory functions such as operation of an alarm, or a predetermined operation of the valve motor VM or equivalent.

In the event the supervisory system itself becomes inoperative, for example, because of burnout of the heater h of the tube, the output current through the relay winding falls to such extent that an alarm is given, or a predetermined control action effected. The same result occurs if there is power failure of the source of supply of transformer T.

Preferably the relay coil is shunted by a condenser NC of suitably large capacity, for example, two microfarads, to prevent chattering of the relay contacts because of the pulsations of the anode current of the tube.

When tube ST is of the '55 type, and for the circuit constants given above, the output voltage of secondary S2 may be about 180 volts, the output voltage of the tapped portion of secondary S2 may be about 40 volts, the output voltage of secondary S1 may be about 40 volts, and the output voltage of secondary S3 may be about 2.5 volts.

Figure 3:
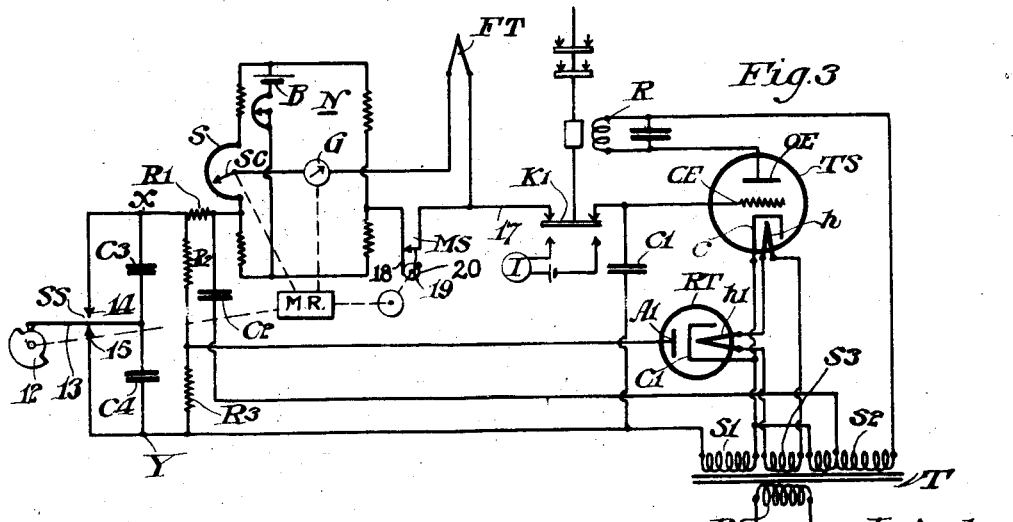
Fig. 3 is a wiring diagram of a modification similar to Fig. 2.

In the modifications shown in Figs. 2 and 3, the use of the supervisory system is extended to give a warning, or to effect a predetermined control action, either upon failure of the mechanical relay mechanism, as in the system of Fig. 1, or upon occurrence of a failure in the measuring network. In effect, the measuring network N, specifically a split-circuit potentiometer, is interposed between the grid CE and resistance R1 of a system such as shown in Fig. 1. Referring to Fig. 2, the circuit from the upper end of resistance R1 to the grid CE may be traced through two paths, one through the slidewire S, contact SC, galvanometer G, thermocouple FT, and lead 17 connected to grid CE, and the other through the measuring network to the contacts 18 and 19 of switch MS, thence to conductor 17.

Between the lower terminal of the secondary S1 of transformer T and the grid CE is connected a condenser C1 of suitable magnitude, for example, .1 microfarad; a similar condenser C2 is connected between the upper end of resistance R1 and an intermediate point of the secondary S2 of transformer T whose instantaneous potential is always equal and opposite to the potential of the lower terminal of the secondary S1. Under normal conditions, with the measuring circuit intact and with continued rotation of shaft 4 effecting periodic actuation of switch SS, the potential of the grid CE is essentially the same as that of cathode C and accordingly the plate current of the tube which flows through the relay R is sufficient to maintain the contacts K1, K2, K3 and K4 in the positions indicated. The potential of the grid is the resultant of negative potential impulses applied through condenser C1 and equally positive potential impulses applied through condenser C2; the circuit to the grid through condenser C2 is, as above described, completed through measuring circuit.

So long as the measuring circuit is complete, these two potentials effectively cancel each other as applied to the control electrode in tube ST; assuming, however, the measuring circuit becomes inoperative, for example because of open-circuit in the thermocouple, galvanometer or slidewire contact SC, and that switch MS has been opened by the cam 20, the circuit through condenser C2 to the grid of the tube is interrupted; both of the paths traced above are open, one because of opening of switch MS, which occurs for each cycle of shaft 4, and the other because of the fault in the measuring circuit. Because of this open circuit, the positive impulses fed to the grid CE through condenser C2 are no longer applied, leaving only the negative impulses through condenser C1, which, because acting alone, result in application of a negative bias to the grid CE which reduces or stops the flow of current in the plate circuit of the tube. Thereupon the contact structure of relay R moves to effect, as above described, operation of a signal or an emergency control, or both.

The cam 20 is so constructed and so positioned on shaft 4 that the switch MS is open during that portion of the cycle for which the galvanometer pointer 1 is held clamped; the periodic operation of switch MS to test or check the continuity of the measuring network therefore does not affect the normal functioning of the measuring network. Though cams 12 and 20 have been shown as separate cams, their functions may be performed by a single cam.

The supervisory system of Fig. 2 has no effect upon the normal controlling or recording action, but is effective upon occurrence either of a mechanical or electrical defect causing the mechanism of the mechanical relay to cease functioning, or upon occurrence of an electrical defect in the measuring circuit, either to give a warning that the control apparatus is no longer functioning properly, or to effect a predetermined operation of the valve motor VM.

The galvanometer has a null response when the network is balanced and also when the branch circuit including the galvanometer and thermocouple is open circuited; except for the supervisory system, no control action, even though necessary, would result when the null response is due to the latter cause, derangement of the measuring circuit.

In the system shown in Fig. 2, it is apparent that if there is an open-circuit in the measuring circuit, the path through condenser C2 to the grid CE is nevertheless completed except when switch MS is open; therefore, even though the measuring circuit becomes inoperative, the grid of the tube is nevertheless at proper potential for at least a substantial part of the cycle. To prevent the relay from reclosing after it once has operated in response to a fault in the measuring circuit, or for any other reason, it is provided that the relay shall interrupt the grid circuit upon deenergization of the relay; specifically, when relay contact K1 falls from its "up" position, the path to the grid from condenser C2 is interrupted. Thus, upon occurrence of failure of the control system, the relay, once it has been deenergized, must be reset by an operator, or automatically in response to restoration of proper operating conditions, before the controller will again function.

The controller mechanism of Fig. 2 is somewhat different from that shown in Fig. 1, in that disk 9b is in Fig. 2 capable of being angularly adjusted by cams RC and LC through member 8 in a sense and to an extent determined by the sense and extent of deflection of galvanometer pointer 1.

Whereas the particular mechanical relay mechanism shown in Fig. 1 is suitable for control purposes, that shown in Fig. 2 is suitable, in addition, to indicate or record the changes in magnitude of the temperature or other controlled condition. The marker or pen MP is connected as by cord 21 to the pulley 22 on the shaft 23 which is connected to the clutch disk 9b. Accordingly, as more fully described in the aforesaid Leeds and Squibb patents, the shaft 23 is adjusted by the mechanical relay mechanism in accordance with deflection of galvanometer G to effect rebalancing adjustment of the slidewire S with respect to its contact SC, and concurrently to move the marker MP with respect to the record sheet or scale 24. The recorder marker is therefore adjusted under the control of the galvanometer in accordance with the changes in magnitude of the measured condition. This modification also differs from that shown in Fig. 1 in that the circuit of the valve motor VM is controlled by a switch disk 25 mounted on shaft 23 instead of by cams RC, LC.

When the measuring network is in balance with the temperature at the desired magnitude, the contact 88 is out of engagement with contacts L8 and R8 upon disk 25; upon increase in temperature, the disk 25 is adjusted by the mechanical relay mechanism, as above described, to effect engagement of contact R8 with contact 88, whereupon the motor VM is energized in proper direction to close the valve V2 to greater or lesser extent. Conversely with the temperature low, the disk 25 is moved in counterclockwise direction to effect engagement of contact L8 with contact 88 for reverse rotation of motor VM.

In the particular arrangement shown, the motor VM is of the split-field reversible type, and the contacts 88, R8 and L8 constitute a reversing switch for the motor effecting energization of field LF when the temperature is high and of field RF when the temperature is below normal. Other known types of reversible operating means may of course be substituted for motor VM.

The circuit of either or both of these field windings of motor VM may be interrupted when the relay R is deenergized to prevent energization of either or both of fields LF, RF irrespective of the relative positions of contacts L8, R8 and 88 when the controller mechanism or the measuring circuit becomes deranged; specifically, the contact K3 is adapted to open the circuit of the field coil LF, and contact K2 is adapted to open the circuit of field coil RF.

As thus far described, the derangement of the control system would simply prevent automatic operation of the valve motor VM, or equivalent, by the control apparatus. Upon being warned the apparatus is not in operative condition, the operator may effect the desired operation of motor VM by switches 26, 27.

As a further safety precaution it is, however, advisable to insure safe operating condition in the event the operator may, for one reason or another, fail to heed the warning afforded by indicator I. In the specific arrangement shown, by closure of switch 28, or by making an equivalent permanent connection, it is provided that when the relay R is deenergized, the field LF of the motor is energized through contact K3 to effect a valve-closing operation of the motor VM which may continue until the motor circuit is opened by the lower limit switch LL.

In some systems, for example in systems for controlling pressure in a gas distribution system, the control, in event of failure of the automatic control apparatus, should be set to maximum for safety. This involves merely obvious changes in the connections between the motor and contact structure of relay R. In other systems, for example in systems of combustion control, it is desirable in event of failure of the automatic control apparatus, that the control valves, or equivalent, should be left in the positions which they had at the time of failure. This is accomplished in the supervisory system of Fig. 2 by opening switch 28, or omitting the connection thereto.

Though the invention is especially of value in automatic control systems, it is also of value in recording or measuring systems without the automatic control feature, since it provides, upon derangement of the apparatus, a warning that the record or indication should not be relied upon.

In the system of Figs. 1 and 2, the tube ST is essentially two tubes in a single envelope and having a common cathode; the elements CE, OE and C constitute a triode and the elements A, A, and C constitute a duo-diode. In either of these systems the tube ST may be replaced, as shown in Fig. 3, by a triode TS and a rectifier or diode tube RT. When two tubes are so used, it is desirable to connect their heaters $h$ and $h'$ in series for supply from the secondary S3 so that in event either heater burns out the cathode C of tube TS ceases to emit electrons, whereupon the relay R opens to afford a warning or to effect emergency control.

Since the electrical connections are the same as in Fig. 2, the description of the circuits of Fig. 2 here applies. The mechanical connections from the galvanometer to the mechanical relay MR and from the relay mechanism to the operating cams of the switches MS and SS are shown by dash lines. This modification may be used in systems in which the galvanometer, or equivalent, controls the actuation of a valve, rheostat, or the like, a recorder marker, or other exhibiting means.

The modification shown in Fig. 4 also provides a supervisory system for systems of the types shown in Figs. 1 and 2; it responds upon failure of the mechanism of the mechanical relay or to derangement of the measuring network, either to give a warning or to assume control, or both.

One terminal of the secondary S1 is connected to the cathode C of tube TS and the other terminal of the secondary is connected to the control electrode CE of the tube through resistance GL of suitably high magnitude, for example 10,000 ohms. The grid CE of the tube is also connected by conductor 17 to one terminal of the primary P4 of transformer T4, whose other primary terminal is connected to contact 45 of switch Ss. The cathode of the tube is also connected to the contact 44 of switch Ss. The switch Ss includes a movable contact 43 biased away from contacts 44, 45, as by a spring 46, and mechanically connected to a pivotally mounted disk 47 of conductive material, as copper.

Upon shaft 4 or other movable shaft of the mechanical relay mechanism is mounted a magnet 48 so disposed that the poles of the magnet are adjacent the disk 47. So long as the magnet 48 is rotating, it produces a torque upon the disk 47 for maintaining the switch Ss closed. Under this condition the potential of the control electrode CE with respect to cathode C is such that the anode current is sufficient to maintain energization of relay coil R. When, however, for any reason the shaft 4 of the relay mechanism ceases to rotate, the switch Ss is opened because of the biasing action of spring 46, or equivalent, whereupon the control electrode CE becomes negative with respect to its cathode C; consequently the anode current through the relay R falls to such low value that the relay contacts open to provide, as in the modifications previously described, either a warning signal or a predetermined operation of the valve motor, or equivalent, in a safe sense.

Assuming switch MS to be closed, and that there is no open circuit in the galvanometer, in the thermocouple, or between the galvanometer and the slidewire S through the thermocouple, the output circuit of the secondary S4 of transformer T4 comprises two parallel paths, one through the galvanometer G, thermocouple T, slidewire contact SC, slidewire S, conductor 17a, contact K1, and the other through switch MS, the measuring network N, and conductor 17a. Under these conditions the transformer T4 is loaded and, as viewed from tube TS, constitutes an input impedance of relatively low magnitude. Under this circumstance, the potential of the grid CE is of such magnitude that the relay R remains energized.

Assuming, however, that the measuring circuit has become deranged, for example because of burn-out of the thermocouple, breakage of the galvanometer suspensions or burn-out of its coil, or because of poor contact between the slidewire S and its contact SC, and that switch MS has opened, as it does once for each cycle of the mechanical relay mechanism MR, the transformer T4 is unloaded, and as viewed from the tube TS is an impedance of substantially high magnitude. Consequently, the grid CT of the tube TS becomes less positive, or even negative, with respect to its cathode C causing such reduction in the anode current of the tube that the relay R is effectively deenergized and its contacts K1 moved to their "down" position to produce, as in the systems of Figs. 1 and 2, a warning signal, or to assume control of the valve motor, or equivalent device, normally controlled by the measuring network.

In the system of Fig. 4 there may be utilized instead of the magnetic torque device MD, a centrifugal device CD, such as shown in Fig. 4A. So long as the shaft 4 of the mechanical relay is rotating, the action of centrifugal force on the fly-ball FB of the centrifugal device maintains engagement of the contacts 54, 55 of switch Ss. When, however, the rotation of shaft 4 ceases, the switch Ss is opened to effect operation of the relay R, as explained in the previously described modifications.

In the system shown in Fig. 5, the tube TS is of the '47 or '46 type, of which it is characteristic, when the grids are connected together to form a control electrode CE, that the anode current is substantially zero when the control electrode and cathode are at substantially the same potential.

In this modification the resistance GL is connected directly between the control electrode CE and the cathode C. One terminal of secondary S1 is connected to cathode C and the other terminal of the secondary is connected to the control electrode CE through the switch Ss, to the measuring network N; between the point of connection to the control network and conductor 17 the circuit splits, there being one path through the slidewire S, contact SC, galavnometer G and thermocouple FT, and another path being through the measuring network and switch MS.

When switch Ss opens because of failure of the mechanical relay mechanism MR, the connection from the transformer secondary S1 to the grid CE of the tube is interrupted. Thereupon the grid assumes the same potential as the cathode, and the plate current falls to such extent that the relay R is deenergized. In the event of an open circuit in the path from conductor 17 through thermocouple T and galvanometer G to the slidewire, the opening of switch MS in the next cycle of operation of the mechanical relay, opens the circuit from the secondary S1 to the grid CE, whereupon the grid assumes the potential of the cathode and the plate current falls, causing the relay R to open.

Therefore, the supervisory system of Fig. 5 causes operation of the supervisory relay R either when the mechanical relay mechanism or the measuring network becomes deranged to provide a warning signal or to assume control of a valve motor, or equivalent device, normally controlled by the measuring network. It is, of course, to be understood that the switch Ss may be operated in accordance with any suitable device responsive to continued rotation or functioning of the mechanical relay mechanism; for example, in lieu of the magnetic-tongue device MD there may be utilized the centrifugal device CD of Fig. 4A.

This system is also suited for systems in which the galvanometer controls the adjustment of exhibiting means, or of a valve, rheostat or other device for varying the magnitude of a condition.

The system shown in Fig. 6 is essentially the same as that of Fig. 5, except that in lieu of the secondary S1, switch Ss and its operating device MD or equivalent, there is utilized a small alternator AC whose armature is rotated so long as the shaft 4 of the mechanical relay mechanism is rotated. One terminal of the alternator is connected to the cathode C of the tube TS and the other terminal of the alternator is connected to the control electrode of the tube through two paths, one intermittently broken by the switch MS and the other complete so long as the circuit from the slidewire through the galvanometer and thermocouple FT is complete. So long as the mechanical relay mechanism is functioning, the alternator AC, assuming the measuring network to be complete, supplies excitation for the control electrode of the tube and consequently the relay remains energized. In this modification the alternator AC must be properly synchronized and phased with respect to the voltage of power source P.

When the shaft 4 of the relay mechanism ceases to rotate, the excitation supplied by alternator AC disappears and the grid CE assumes the same potential as the cathode, causing deenergization of the relay R.

Assuming that the alternator armature continues to rotate but that an open circuit occurs in the branch circuit including the slidewire contact, galvanometer G and thermocouple T, the grid assumes the cathode potential for that part of the next succeeding cycle when the switch MS is opened. The relay is therefore deenergized to provide a warning or to perform control functions as in the previously described modifications.

In both the systems of Figs. 5 and 6 it is desirable that, as in previously described modifications, the path from the grid to the measuring network be interrupted as by circuit opening movement of contact K1. This lock-out action requires the operator to locate and remedy the fault before automatic control action can be resumed.

While preferred modifications of the invention have been illustrated and described, it is to be understood the invention is not limited thereto but is coextensive in scope with the appended claims.

For brevity in the claims, the expression "supervisory means," where not inconsistent with the context, is used generically to comprehend means for producing an indication, or for assuming control of a device or apparatus normally operable by the automatic control system in response to changes in magnitude of the controlled condition.

Also for brevity in the appended claims, the term "control" or "controller," when not inconsistent with the context, is used generically to comprehend apparatus for effecting movement of a valve, rheostat, or the like for varying or restoring the magnitude of a condition, or for effecting movement of exhibiting means, such as a recorder marker, or an indicator.

The arrangement for affecting the supervisory tube upon derangement of the measuring network is not herein broadly claimed except in combination with means for detecting derangement of a part of the system other than said measuring network; such arrangement per se is claimed in copending joint application of Davis et al. Serial No. 35,062, filed August 7, 1935.

What I claim is:

1. In a system for effecting adjustment of means in response to changes in magnitude of a condition, means responsive to changes in magnitude of the condition, relay means through which said responsive means controls said adjustable means, and a supervisory system comprising an electronic tube, supervisory means unaffected by changes in magnitude of said condition and included in the output system of said tube, and means in the input system of said tube responsive to derangement of said relay means to effect operation of said supervisory means.

2. In a system for effecting adjustment of means in response to changes in magnitude of a condition, means responsive to changes in magnitude of the condition, relay means through which said responsive means controls said adjustable means, and a supervisory system comprising an electronic tube, having a control electrode and an output system, supervisory means unaffected by changes in magnitude of said condition and included in said output system, and means effective during operativeness of said relay means to maintain said control electrode at a potential precluding operation of said supervisory means.

3. In a system for effecting adjustment of means in response to changes in magnitude of a condition, means responsive to changes in magnitude of the condition, relay means through which said responsive means controls said adjustable means, and a supervisory system comprising an electronic tube, having a control electrode and an output system, supervisory means in said output system, and periodically operated switching means effecting during operativeness of said relay means to maintain said control electrode at a potential precluding operation of said supervisory means.

4. In a system for effecting adjustment of means in response to changes in magnitude of a condition, means responsive to changes in magnitude of the condition, relay means through which said responsive means controls said adjustable means, and a supervisory system comprising an electronic tube, having a control electrode and an output system, supervisory means unaffected by changes in magnitude of said condition and included in said output system, and means in the input system of said tube effective during operativeness of said relay means to impress upon said control electrode a voltage precluding operation of said supervisory means.

5. In a system for effecting adjustment of means in response to changes in magnitude of a condition, means responsive to changes in magnitude of the condition, relay means through which said responsive means controls said adjustable means, and a supervisory system comprising an electronic tube, means for supplying the electrode circuits of said tubes, supervisory means in the output system of said tube, and means for interrupting a circuit from said supply means to the control electrode of said tube upon derangement of said relay means to effect operation of said supervisory means.

6. In a system for effecting adjustment of means in response to changes in magnitude of a condition, means responsive to changes in magnitude of the condition, mechanical relay means, including a normally continuously movable member, through which said responsive means controls said adjustable means, and a supervisory system comprising an electronic tube, a resistance-reactance network in the input system of said tube, supervisory means in the output system of said tube, and switching means intermittently operated by said member and cooperating with said network to preclude operation of said supervisory means during motion of said member.

7. The combination with a system comprising means responsive to changes in magnitude of a condition, adjustable means, relay means through which said responsive means controls said adjustable means, of supervisory means, unaffected by changes in magnitude of said condition, for detecting derangement of said responsive means and mechanical derangement of said relay means independently of the effects of such derangements upon the magnitude of said condition.

8. The combination with a system comprising means responsive to changes in magnitude of a condition, adjustable means, relay means through which said responsive means controls said adjustable means, of signal means, and supervisory means irresponsive to changes in magnitude of said condition and responsive to derangement of said responsive means and of said relay means to effect operation of said signal means upon occurrence of either of said derangements and independently of the effect of such derangement upon the magnitude of said condition.

9. In a system for controlling the magnitude of a condition, means responsive to changes in magnitude of said condition, means adjustable to vary the magnitude of said condition, mechanical relay means interposed between said responsive means and said adjustable means, and supervisory means, irresponsive to changes in magnitude of said condition, directly responsive to derangement of said condition-responsive means and to mechanical failure of said relay means.

10. In a system for controlling the magnitude of a condition, means responsive to changes in magnitude of said condition, means adjustable to vary the magnitude of said condition, mechanical relay means interposed between said responsive means and said adjustable means, signal means, and supervisory means irresponsive to changes in magnitude of said condition and responsive to derangement of said condition-responsive means and to derangement of said relay means to effect operation of said signal means upon occurrence of either of such derangements.

11. In a system for controlling the magnitude of a condition, means responsive to changes in magnitude of said condition, means adjustable to vary the magnitude of said condition, mechanical relay means interposed between said responsive means and said adjustable means, and supervisory means, irresponsive to changes in magnitude of said condition, directly responsive to derangement of said condition-responsive means and to derangement of said relay means by mechanical failure thereof to assume control of said adjustable means upon occurrence of either of said derangements.

12. In a system for controlling the magnitude of a condition, means responsive to changes in magnitude of said condition, means adjustable to vary the magnitude of said condition, mechanical relay means interposed between said responsive means and said adjustable means, and supervisory means, irresponsive to changes in magnitude of said condition, directly responsive to derangement of said condition-responsive means and to derangement of said relay means by mechanical failure thereof to effect operation of said adjustable means in a sense rendering said system safe upon occurrence of either of said derangements.

13. In a system for effecting adjustment of means in response to changes in the magnitude of a condition, a balanceable measuring network, means responsive to unbalance of said network, relay means interposed between said responsive means and said adjustable means, and supervisory means responsive to derangement of said network or mechanical failure of said relay means.

14. In a system for effecting adjustment of means in response to changes in the magnitude of a condition, a balanceable measuring network, means responsive to unbalance of said network, relay means interposed between said responsive means and said adjustable means, signal means, and supervisory means responsive to derangement of said network or mechanical failure of said relay means to effect operation of said signal means.

15. In a system for effecting adjustment of means in response to changes in the magnitude of a condition, a balanceable measuring network, means responsive to unbalance of said network, relay means interposed between said responsive means and said adjustable means, and supervisory means responsive to derangement of said network or mechanical failure of said relay means to assume control of said adjustable means.

16. In a system for effecting adjustment of means in response to changes in the magnitude of a condition, a balanceable measuring network, means responsive to unbalance of said network, relay means interposed between said responsive means and said adjustable means, and supervisory means responsive to derangement of said network or mechanical failure of said relay means to preclude operation of said adjustable means in a sense rendering the system unsafe.

17. In a system for effecting adjustment of means in response to changes in the magnitude of a condition, a balanceable measuring network, means responsive to unbalance of said network, relay means interposed between said responsive means and said adjustable means, and supervisory means responsive to derangement of said network or mechanical failure of said relay means to effect operation of said adjustable means in a sense rendering said system safe.

18. In a system for effecting adjustment of means in response to changes in the magnitude of a condition, a balanceable measuring network, means responsive to unbalance of said network, relay means interposed between said responsive means and said adjustable means, and a supervisory system comprising an electronic tube, means in the input circuit of said tube for maintaining a predetermined potential of the control electrode of said tube so long as said measuring network and said relay means are in operative condition, and supervisory means in the output system of said tube operated upon change in magnitude of said potential.

19. In a system for effecting adjustment of means in response to change in the magnitude of a condition, a balanceable measuring network, means responsive to unbalance of said network, relay means interposed between said responsive means and said adjustable means, and a supervisory system comprising an electronic tube, means in the input system of said tube to provide a predetermined potential of the control electrode of said tube so long as said measuring network and said relay means are in operative condition, and supervisory means in the output system of said tube operative upon change in magnitude of said potential.

20. In a system for effecting adjustment of means in response to changes in the magnitude of a condition, a balanceable measuring network, means responsive to unbalance of said network, relay means interposed between said responsive means and said adjustable means, and a supervisory system comprising an electronic tube, supervisory means in the output system of said tube, and means in the input system of said tube to preclude operation of said supervisory means so long as said measuring network is intact and said relay means is in operative condition.

21. A system comprising means to be adjusted in response to changes in magnitude of a condition, means responsive to changes in magnitude of said condition, a controller for actuating said adjustable means controlled by said responsive means and having a normally continuously rotating element, a supervisory system comprising an electronic tube, supervisory means in the output system of said tube, and means operable so long as said element is rotating to maintain the control electrode of said tube at such potential as to preclude operation of said supervisory means.

22. In combination with a controller including mechanical relay mechanism having a normally continuously rotating element, and means responsive to changes in magnitude of a condition for normally controlling said mechanical relay mechanism, of supervisory means comprising an electronic tube, supervisory means in the output system of said tube, and switching means intermittently operated so long as said element is rotating to maintain the control electrode of said tube at such potential as to preclude operation of said supervisory means.

23. In combination with a controller including a member responsive to unbalance of an electrical network and having a continuously rotating element, of switching means intermittently operated during rotation of said element to test said network, and supervisory means operative upon discontinuance of intermittent operation of said switching means.

24. In combination with an apparatus including a member responsive to unbalance of an electrical network and a continuously rotating element, of means for intermittently testing the continuity of said network comprising switching means intermittently operated during rotation of said element, and supervisory means operative when said testing means detects derangement of said network or when intermittent operation of said switching means is discontinued.

25. In combination with an apparatus including a member responsive to unbalance of an electrical network and mechanical relay mechanism controlled thereby, of an arrangement for intermittently testing the continuity of said network including means intermittently operated while said mechanical relay mechanism is operative, and supervisory means operative when said testing means detects derangement of said network or upon discontinuance of intermittent operation of said means.

ELWOOD T. DAVIS.